United States Patent
Brunsell et al.

(10) Patent No.: US 9,283,418 B2
(45) Date of Patent: *Mar. 15, 2016

(54) CONCENTRATE TREATMENT SYSTEM

(71) Applicant: AVANTech, Inc., Columbia, SC (US)

(72) Inventors: Dennis A. Brunsell, Knoxville, TN (US); Charles E. Jensen, Knoxville, TN (US); Larry E. Beets, Knoxville, TN (US)

(73) Assignee: AVANTech, Inc., Columbia, SC (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/900,548

(22) Filed: May 23, 2013

(65) Prior Publication Data

US 2015/0380117 A1 Dec. 31, 2015

Related U.S. Application Data

(63) Continuation-in-part of application No. 13/820,145, filed on Feb. 28, 2013, now Pat. No. 8,753,518.

(51) Int. Cl.
*B01J 49/00* (2006.01)
*C02F 1/68* (2006.01)
(Continued)

(52) U.S. Cl.
CPC ... *A62D 3/38* (2013.01); *A62D 3/00* (2013.01); *A62D 3/30* (2013.01); *A62D 3/32* (2013.01); *C02F 1/42* (2013.01); *C02F 1/72* (2013.01); *C02F 1/78* (2013.01); *C02F 2101/006* (2013.01); *C02F 2103/34* (2013.01); *G21F 9/12* (2013.01);

(Continued)

(58) Field of Classification Search
None
See application file for complete search history.

(56) References Cited

U.S. PATENT DOCUMENTS

| | | | |
|---|---|---|---|
| 3,595,393 | A | 7/1971 | Messa et al. |
| 3,666,097 | A | 5/1972 | Ryan |

(Continued)

FOREIGN PATENT DOCUMENTS

| | | |
|---|---|---|
| CN | 1232247 C | 10/1999 |
| CN | 1360315 A | 7/2002 |

(Continued)

OTHER PUBLICATIONS

First Chinese Office Action issued on Nov. 3, 2014 in corresponding Chinese patent application No. 201180041888.8.

(Continued)

*Primary Examiner* — Nam Nguyen
*Assistant Examiner* — Richard Gurtowski
(74) *Attorney, Agent, or Firm* — Nelson Mullins Riley & Scarborough, LLP (57) ABSTRACT

One aspect of the invention provides a system for treating wastestream, particularly a liquid or aqueous radwaste, for safe disposal and, in final processing, converting it into one or both forms including an aqueous form for safe discharge to the environment and a solidified form for safe disposal. Another aspect provides the capacity to employ a step where a specific target element strategy can be set up synchronizing sorbent substance choices and multiple recycle options to remove target substances from wastestream as a part of its Sorption or Powder Sorbent Isotopic Reduction step (II). Other steps cooperate with Sorption step (II) including Oxidation (I) to inactivate or destroy existing chelants, Solid-Liquid separation (III), and Selective Ion Exchange (IV) to deliver the wastestream to final processing. Still further aspects of the invention address the recovery and safe handling of substances such as C-14.

33 Claims, 1 Drawing Sheet

(51) Int. Cl.
*G21F 9/00* (2006.01)
*A62D 3/38* (2007.01)
*C02F 1/72* (2006.01)
*G21F 9/12* (2006.01)
*C02F 1/42* (2006.01)
*C02F 101/00* (2006.01)
*C02F 103/34* (2006.01)
*A62D 3/30* (2007.01)
*G21F 9/28* (2006.01)
*A62D 3/00* (2007.01)
*A62D 3/32* (2007.01)
*C02F 1/78* (2006.01)
*G21F 9/30* (2006.01)

(52) U.S. Cl.
CPC . *G21F 9/125* (2013.01); *G21F 9/28* (2013.01); *G21F 9/30* (2013.01)

(56) References Cited

U.S. PATENT DOCUMENTS

| | | | |
|---|---|---|---|
| 3,785,780 A * | 1/1974 | Teichmann et al. | 422/106 |
| 3,805,959 A | 4/1974 | Mertens | |
| 3,873,362 A | 3/1975 | Mihram | |
| 3,947,354 A | 3/1976 | Swanson et al. | |
| 3,968,035 A * | 7/1976 | Howe | 210/621 |
| 4,162,230 A | 7/1979 | Horwitz et al. | |
| 4,289,594 A | 9/1981 | Alpaugh et al. | |
| 4,332,687 A | 6/1982 | Daignault et al. | |
| 4,419,246 A | 12/1983 | Jayawant | |
| 4,512,921 A | 4/1985 | Anstine et al. | |
| 4,578,195 A | 3/1986 | Moore et al. | |
| 4,632,847 A | 12/1986 | Lomasney et al. | |
| 4,737,315 A | 4/1988 | Suzuki et al. | |
| 4,770,783 A | 9/1988 | Gustavsson et al. | |
| 4,792,407 A | 12/1988 | Zeff et al. | |
| 4,802,993 A | 2/1989 | Katoh | |
| 4,814,091 A | 3/1989 | Napier et al. | |
| 4,846,978 A | 7/1989 | Leggett et al. | |
| 5,057,220 A * | 10/1991 | Harada et al. | 210/605 |
| 5,080,799 A | 1/1992 | Yan | |
| 5,122,268 A | 6/1992 | Burack et al. | |
| 5,178,772 A | 1/1993 | Daley et al. | |
| 5,196,124 A | 3/1993 | Connor et al. | |
| 5,246,597 A * | 9/1993 | Jenson et al. | 210/754 |
| 5,322,644 A | 6/1994 | Dunn et al. | |
| 5,328,599 A * | 7/1994 | Siefert et al. | 210/96.1 |
| 5,389,262 A * | 2/1995 | Guess | 210/719 |
| 5,462,671 A | 10/1995 | Arrington et al. | |
| 5,492,633 A | 2/1996 | Moniwa et al. | |
| 5,564,105 A | 10/1996 | Alvino et al. | |
| 5,632,900 A | 5/1997 | Jevec et al. | |
| 5,728,302 A | 3/1998 | Connor et al. | |
| 5,843,308 A | 12/1998 | Suozzo et al. | |
| 5,848,363 A | 12/1998 | Guillermier et al. | |
| 5,885,203 A | 3/1999 | Pelletier | |
| 5,894,077 A | 4/1999 | Jones et al. | |
| 5,908,559 A | 6/1999 | Kreisler | |
| 6,254,782 B1 | 7/2001 | Kreisler | |
| 6,350,376 B1 | 2/2002 | Imaoka et al. | |
| 6,405,626 B1 | 6/2002 | Bureaux et al. | |
| 6,521,131 B1 | 2/2003 | Hamilton et al. | |
| 6,521,809 B1 | 2/2003 | Smith et al. | |
| 6,843,618 B2 | 1/2005 | Lundy | |
| 7,163,632 B1 | 1/2007 | Speece | |
| 7,276,160 B2 | 10/2007 | Jangbarwala | |
| 7,282,470 B2 | 10/2007 | Tucker et al. | |
| 7,772,451 B2 | 8/2010 | Enda et al. | |
| 8,753,518 B2 | 6/2014 | Brunsell et al. | |
| 2003/0108462 A1 | 6/2003 | Oskoui | |
| 2006/0217584 A1 | 9/2006 | Nunez et al. | |
| 2007/0036699 A1 | 2/2007 | Oskoui | |
| 2009/0252663 A1 | 10/2009 | Witheral | |
| 2010/0059428 A1 | 3/2010 | Boren et al. | |
| 2010/0258428 A1 | 10/2010 | Gignac et al. | |

FOREIGN PATENT DOCUMENTS

| | | |
|---|---|---|
| CN | 1988051 A | 6/2007 |
| EP | 0 428 868 A2 | 5/1991 |
| EP | 0 765 842 A1 | 4/1997 |
| EP | 1 803 689 A1 | 7/2007 |
| EP | 1 837 075 A2 | 9/2007 |
| GB | 2005655 A | 4/1979 |
| GB | 2289975 A | 12/1995 |
| RU | 2 105 366 C1 | 2/1998 |
| RU | 2 122 753 C1 | 11/1998 |
| RU | 2 203 512 C1 | 9/2002 |
| RU | 2 225 049 C1 | 2/2004 |
| RU | 2 268 513 C1 | 1/2006 |
| RU | 2 313 148 C1 | 12/2007 |
| RU | 2 342 720 C1 | 12/2008 |
| RU | 2 342 721 C1 | 12/2008 |
| UA | 14319 U | 5/2006 |
| WO | 9637442 A1 | 11/1996 |
| WO | WO 02/096559 | 12/2002 |
| WO | 2007127587 A1 | 11/2007 |
| WO | WO 2007/123436 | 11/2007 |
| WO | WO 2008/002282 | 1/2008 |

OTHER PUBLICATIONS

Printout from "Taylor & Francis Online" of Abstract of "Ozonation of Hanford Nuclear Defense Waste," published in vol. 1, Issue 2 of Ozone Sciense & Engineering: The Journal of the International Ozone Association, (2008).

"Simplified Removal of Chelated Metals," published Apr. 2004 in vol. 102, Issue No. 4 of "Metal Finishing,".

"Separation of Heavy Metals: Removal from Industrial Wastewaters and Contaminated Soil,".

"The Treatment of Radioactive Ion-Exchange Resins: Low-Temperature Resin Oxidation Process," prepared by EPRI Nondestructive Evaluation Center, (1991).

Extended European Search Report issued in corresponding application No. 11832996.0 on Mar. 23, 2015.

International Search Report and Written Opinion issued on Feb. 9, 2012 in corresponding International Patent Cooperation Treaty No. PCT/US2011/053185.

Helmestine, Anne; "Table of Common Standard Reduction Potentials" from the Handbook of Chemistry and Physics, accessed via About.com; 2008; CRC Press; 89th edition.

* cited by examiner

CONCENTRATE TREATMENT SYSTEM

CROSS-REFERENCE TO RELATED APPLICATIONS

This application claims the benefit of U.S. application Ser. No. 13/820,145, filed Feb. 28, 2013 and presently pending, which is a National Stage Entry of PCT/US11/53185 filed Sep. 25, 2011, which Claims Priority from Provisional Application 61/393,804, filed Oct. 15, 2010; the disclosures of which are incorporated herein by reference in their respective entireties.

BACKGROUND OF THE INVENTION

1. Field of the Invention

The present invention relates to a Method, Process or System for processing and treating a radioactive liquid or aqueous concentrate, such as a nuclear fuel plant stream, or liquid or aqueous concentrate containing radwaste or other forms of environmental waste.

2. Background Information

It has been documented that a number of plants in North America, Asia, and Europe, particularly Eastern Europe, and in other locations around the world, have been dealing with the problem of stored radioactive concentrate fluids (or radioactive agents in solution), or historical concentrates, which have, especially in the last 20-30 years grown to great stored volumes at various plants. Therefore, radionuclide removal from nuclear power plant's liquid radwaste has become an important priority for the European Union and its member states and other countries of the world. These plants have frequently included nuclear power plants where energy obtained by nuclear fission is transformed into electricity.

An example of such a plant is the Kola NPP in the Polyarnye Zori/Murmansk Region, Russian Federation. Accumulated LRW (Liquid Radioactive Waste) at this plant had, at one point, been temporarily stored in stainless steel tanks and was to have been processed in such a way as to allow safe long-term storage, haulage and final disposal of such waste. This plan had not proven to be adequately successful. The Kola NPP (Nuclear Power Plant) had operated a system for the removal of radionuclides from evaporator concentrate decantates and salt crystalline deposits. This process had consisted of an oxidation phase and a filtration phase. In their case oxidation was achieved by ozone ejection into the liquid radwaste. However, this approach did not control temperature and pH in an ideal state to further the ozone process involved, allowing it to go up to 90 degrees F. (or about 32.22 degrees C.) where soluble ozone went to about zero solubility; and, therefore, was subject to poor utilization; where it was not absorbed into water and lost as gas. The pH was not controlled in an optimum range that both prevented boron precipitation and optimized utilization of the ozone. Filtration was applied to separate (non-soluble) radioactive oxidation products from its liquid phase, but only micro-filtration rather than ultrafiltration which allowed particulate activity smaller than microfiltration range to pass. Cobalt, silver and iron isotopes are often found in about colloidal to about the lower end of the microfiltration range. In the past some of the equipment and method approaches used in this system had been found deficient in terms of meeting the needed performance requirements and with regard to the reliability or in terms of efficiency; and in general significant improvements to this type of process have sorely been needed to address this plant and plant areas like this.

Inventions the subject of patent publication in the past suffer from a number of disadvantages; and, in one or more ways, appear to have only tangential relationship to the present invention.

See, for example: U.S. Pat. No. 4,894,091 to Napier et al. which teaches a process for removing metals from water including the steps of prefiltering solids from the water, adjusting the pH to between about 2 and 3, reducing the amount of dissolved oxygen in the water, increasing the pH to between about 6 and 8, adding water-soluble sulfide to precipitate insoluble sulfide- and hydroxide-forming metals, adding a flocculating agent, separating precipitate-containing floc, and postfiltering the resultant solution; and where the postfiltered solution may optionally be eluted through an ion exchange resin to remove residual metal ions.

U.S. Pat. No. 7,772,451 to Enda et al. discloses what is said to be a system for chemically decontaminating radioactive material, distinguishable from the present invention in providing, in its broadest sense, for "a system for chemically decontaminating radioactive material which forms a passage for liquid to flow through, comprising: a circulation loop connected to the passage for circulating a decontamination liquid, the circulation loop comprising a decontamination agent feeder feeding the decontamination liquid that is reductive and that is an aqueous solution comprising a monocarboxylic acid (namely, "formic acid") and a di-carboxylic acid (namely, "oxalic acid") to the decontamination liquid; a hydrogen peroxide feeder feeding hydrogen peroxide to the decontamination liquid; an ion exchanger for separating and removing metal ions in the decontamination liquid; and an ozonizer for injecting ozone into the decontamination liquid or an oxidizer feeder feeding permanganic acid or permanganate to the decontamination liquid; and wherein the system does not contain a device for reducing trivalent iron atoms into bivalent iron atoms, and wherein any acid present in the system is an organic acid. This system, as well as that of Napier et al. just above, does not employ the present invention's process steps of Oxidation or Ozone Oxidation (I) Sorption or Powder Sorbent Isotopic Reduction (II), Solid-Liquid Separation (III), Adjustable and Configurable Ion exchange (IX) (IV), and Within Step V: Discharge of Water (Va) or Drying of resulting waste stream dissolved solids to Dry Solids (Vb).

U.S. Pat. No. 5,196,124 to Connor et al. appears to involve a method for reducing the radioactive material content of fluids withdrawn from subterranean reservoirs which employs the deposition of sorbent solids within its reservoir matrix surrounding its production well to act as an in-situ filter for dissolved radionuclides present in reservoir pore waters. Though using a form of sorption application, Connor does not facilitate this use in the same manner or staging as that set forth in the present invention. It does not employ the order of steps used or the effect so obtained by Oxidation prior to sorption; or Solid-Liquid Separation, Adjustable and Configurable ion exchange, or discharge of water or drying of waste stream dissolved solids to dry solids, all after the step of sorption. See also U.S. Pat. No. 5,728,302 to Connor; engendering similar distinctions in relation to the present invention.

U.S. Pat. No. 5,908,559 to Kreisler sets forth a METHOD FOR RECOVERING AND SEPARATING METALS FROM WASTE STREAMS. The 25 method involves steps, distinguishable from the present invention, where: pH of a waste stream is adjusted; a metal complexing agent is added; a particle growth enhancer is added; a flocculating agent is added resulting in a solution; the solution effluent is dewatered, preferably using a plate and frame press, resulting in a sludge and a supernatant; and metals are recovered from the sludge upon melting, drying and dewatering a filter cake with melting enhancers so as to permit selective removal of a fused metal-bearing concentrate for casting into ingots to be sold to primary smelters.

U.S. Pat. No. 7,282,470 to Tucker et al., though utilizing a water soluble sorbent additive, namely sorbitol or mannitol; is otherwise dissimilar to the steps of the method of the present invention.

U.S. Application No. 200910252663 of Wetherill, provides for a METHOD AND SYSTEM FOR THE REMOVAL OF AN ELEMENTAL TRACE CONTAMINANT FROM A FLUID STREAM; and includes within its steps passing a fluid stream with an elemental trace contaminant through a flow-through monolith comprising an oxidation catalyst to oxidize the elemental trace contaminant; and contacting the fluid stream comprising the oxidized trace contaminant with a sorbent free of oxidation catalyst to sorb the oxidized trace contaminant. However, it otherwise lacks the functional effect brought about by the other inclusive steps of the present invention.

In the PCT publication, WO2007123436 (A1) of ALEXANDROVI et al. as inventors; the disclosure appears to disclose the use of a sorbent and the use of oxidizers such as potassium permanganate. However, this process does not employ the order sequence of the 25 present invention; nor employ Solid-Liquid Separation III, Adjustable and Configurable Ion exchange (IX) IV , or Discharge of Water (Va) or Drying of resulting waste stream dissolved solids to Dry Solids (Vb), as carried out in the present invention.

The Russian patent, RU 2122753 (C1) to Dmitriev, et al. appears to set forth elements within a process which consists in oxidative treatment of waste through ozonation in the presence of oxidation catalyst and/or radionuclide collector; solid-liquid separation and, further downstream, a liquid phase finally purified on selective sorbents. However, the order sequence and qualitative composition of the steps is dissimilar to the present invention; and Dmitriev does not employ Adjustable and Configurable Ion exchange (IX) (IV), and Within Step V: Discharge of Water (Va) or Drying of resulting waste stream dissolved solids to Dry Solids (Vb) in the same manner as the present invention; nor is clear from an absence of descriptive illustration as to the routing and nature of treatment to achieve radionuclide separation.

It will, therefore, be understood by those skilled in these technologies that a substantial and distinguishable process and system with functional and structural advantages are realized in the present invention over the past conventional technology with regard to processing, treating, packaging and chemically affecting radwaste liquid or a concentrate fluid stored or located at or in relation to a nuclear plant. It will also be appreciated that the efficiency, flexibility, adaptability of operation, diverse utility, and distinguishable functional applications of the present invention all serve as important bases for novelty of the invention, in this field of technology.

SUMMARY OF THE INVENTION

The foregoing and other objects of the invention can be achieved with the present invention's method and system. In one aspect, the invention includes a method and associated system for processing and treating a radioactive concentrate, often stored as historical aqueous concentrate, or other radwaste or forms of environmental or hazardous waste which includes the steps, designated as Roman numerals: I, II, III, IV and V as follows:

Oxidation or Ozone Oxidation I, when needed for the destruction of existing chelants
Sorption or Powder Sorbent Isotopic Reduction II
Solid-Liquid Separation III
Adjustable and Configurable Ion exchange (IX) IV, and
Within Step V: Discharge of Water (Va) or Drying of resulting Liquid waste stream dissolved solids to Dry Solids (Vb).

A further aspect is directed to processing and elimination of C-14.

BRIEF DESCRIPTION OF THE DRAWING

The single Drawing illustration figure of the application is a flow chart and schematic representation of a Concentrate Treatment System method of treating an aqueous radioactive fluid in a nuclear reactor cycle or radwaste system according to an exemplary embodiment of the present invention, also referred to herein as the Drawing or Drawing figure.

REFERENCE NUMERALS AND SIGNS 10 method and system of treating radioactive concentrate, the Concentrate Treatment System or invention's method
I (Roman Numeral One) Step of Oxidation or Ozone Oxidation or oxidation step
II Step of Sorption or Powder Sorbent Isotopic Reduction
III Step of Solid-Liquid Separation
IV Step of Adjustable and Configurable Ion Exchange (IX)
V Step of Direct Discharge of Water (Va) or Drying of resulting waste stream to Solids (Vb) and Discharge or Recycle of Water
    8 wastestream or feed stream
    6 stored location, container area or facility
    12 recycle oxidation vessel
    14 supply line for (12)
    14a oxidation return line
    IX ion exchange
    16b ozone eductor and mixing equipment
    17 ozone supply line
    16a ozone supply skid or module
    11 ORP measurement station
    18 heat exchanger
    23 pump (or other equivalent conveyance energy or force)
    22 oxidation recycle line
    24 sorbent supply area
    24a supply line from (24)
    13 pH/temperature measurement area
    15 chemical injection skid
    19 eductor supply feed
    20 sorbent treatment area (vessel or container)
    38 central recycle line
    21 transfer line
    25 mixer
    26 solids transfer line
    28 solids collection tank
    31 sorbent recycle line
    34 filter unit
    35 filter media of (34)
    33 separation and settling device (and such types of equipment and means)
    22A first recycle line
    31A second recycle line
    36A filter recycle line or third recycle line
    30 pump (or other means of motive or conveyance force)
    7 solids separation device
    7T solids transfer line 28 solids collection tank
40 filter permeate line
42 first IX vessel
43 first IX manifold line
44 second IX vessel
45 second IX manifold line
46 third IX vessel
47 third IX manifold line
48 fourth IX vessel
51 IX effluent line
49 fourth IX manifold line
41 manifold system
50 monitor tank
53 evaporator feed line
54 evaporator unit
52 pH adjustment station
56 pH measurement station
50R recycle line of (50)
55 pump
57a line (associated with Step Va)
57b line (associated with Step Vb)
60 reuse line (selective recycle line to plant)
70 Process controls (for Remote or Computer System Operation)
PLC Computer utilized within the scope and teachings of the invention, programmed to control all the major functions of the system 10 in the sequence required for safe startup, operation and shutdown of the invention's system
HMI Human Machine Interface (or HMI) which is either a dedicated local screen, or on one or more remote computer screens on computers that may be located in a control room supporting use of the present invention, wherein such computers can also be located anywhere in the plant area supporting use of the present invention, or anywhere in the world when internet lines available
71 Soluble Calcium Salts
72 pH adjustment
73 pH adjustment before oxidation with ozone in step (I)
74 pH adjustment after oxidation with ozone in step (I)
75 Evacuation
76 Providing a temperature range for drying in step Vb from greater than or equal to about 100 deg. C. to a temperature of less than or equal to about 240 deg. C

DETAILED DESCRIPTION OF THE PREFERRED EMBODIMENTS

Figure 1:
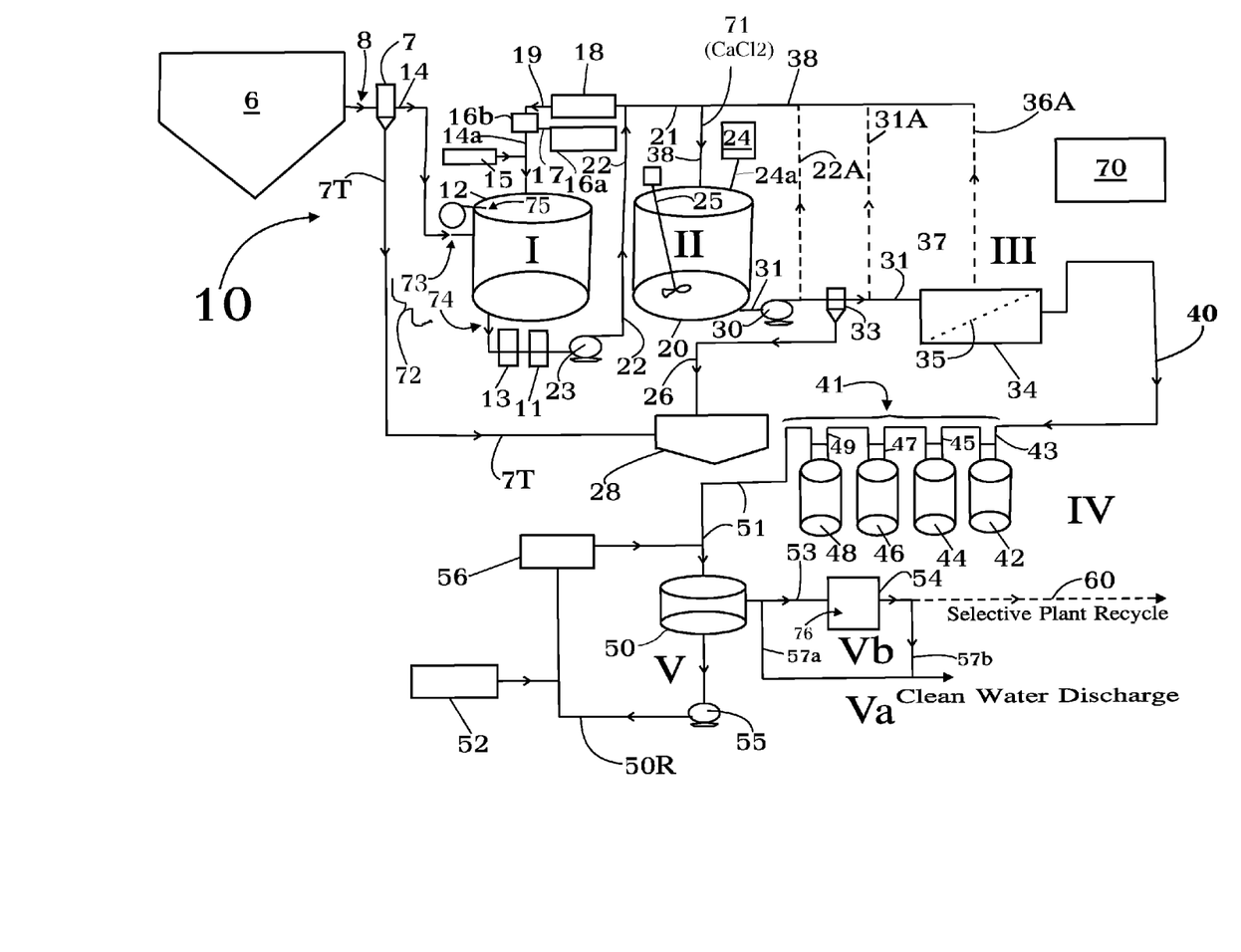

The following description of the preferred embodiments of the concepts and teachings of the present invention is made in reference to the accompanying Drawing figure which constitutes an illustrated example of the teachings, and structural and functional elements, of the present invention's method and system; among many other examples existing within the scope and spirit of the present invention.

Referring now to the single Drawing illustration, the sole drawing figure presented in the present application (also referred to herein as the Drawing), thereof, there is illustrated by schematic means exemplary embodiments of the present invention addressing the method and system of treating radioactive aqueous concentrate, the Concentrate Treatment System or invention's method 10.

In a preferred embodiment of the invention the following steps 15 are included:
Oxidation or Ozone Oxidation—Step I (Roman Numeral One)
Sorption or Powder Sorbent Isotopic Reduction—Step II
Solid-Liquid Separation—Step III
Selective or Adjustable and Configurable Ion exchange (IX)—Step IV
Step V: Discharge of Water (Va) or Drying of resulting dissolved solids stream to Dry Solids V (Vb) and evaporate stream that can be either environmentally discharged or recycled for reuse.

The invention can address a number of problems involving known quality of the water, proposed effluent release limits, and major waste volume reduction during reprocessing of existing stored and new concentrates, as well as a number of other substances, concentrates and fluids. The invention's method 10 can also act to remove such substances as Antimony, Cesium, Cobalt Chromium, Manganese, Iron, Silver and other contaminants.

The oxidation step I (Roman numeral one) of the present invention is preferably a batch operation, though other cycles and volume orientation such as 'continuous' and others can be utilized, lasting from about one (1) hour to about forty-eight (48) hours. The liquid waste stream 8 is provided from a stored location, container area or facility 6. The concentrates or radioactive concentrates discussed above which have been stored for a period of years (historical waste) or recently produced are subject radwaste substances for which the present invention process can be effectively used. In a preferred embodiment of the invention the stream 8 will consist of an historical concentrate stored over the years or recently produced as discussed above in various containers or facilities.

The waste stream 8 is provided or transferred from the stored location 6, containing such radioactive concentrate, often stored, without limitation as to type, as historical concentrate, or other radwaste or forms of environmental or hazardous waste, to the recycle oxidation vessel 12 by the supply line 14. The waste 8 treated by the method 10 will at least in part frequently already contain chelants such as oxalic and citric acid, EDTA, LOMI solution and others. More likely, though not always, the waste 8, the subject of treatment, will contain Oxalic & citric acid and occasionally EDTA. As indicated more fully below, these chelants or others present will he destroyed or inactivated so as not to form a part within the present method 10 of actually or specifically extracting radioisotopes and target substances from the waste 8. This is principally accomplished in the present invention with oxidation and polishing, as opposed to chelation, as set forth herein.

During a contemporaneous period of time during or after the transfer, the pump 23 is started to recycle concentrate from and returning to vessel 12, and heat exchanger 18, when utilized; and the pH and temperature (pH/temperature) measurement area 13 and ORP measurement station 11 are used for measurement purposes to determine further treatment required. The suitability of pH is determined and adjustment is performed if required using the chemical injection skid 15. If antifoaming agent is required this is added using the chemical injection skid 15. The heat exchanger 18 is utilized if temperature adjustment is required to adjust the temperature to a more favorable oxidation range. Due to the increased solubility of oxygen and ozone at lower temperatures the use of cooling to maintain a lower concentrate temperature will increase the rate of oxidation as more oxidant will be dissolved and thus available for oxidation.

After chemical additions the ozone which is supplied on line 17 from an ozone supply skid or module 16a goes through the ozone eductor 16b provided or communicated directly by/in ozone supply line 17 with a volume of ozone or other oxidant supplied through chemical injection skid 15. The oxidation process (I) (or ozone supply process) as manifested in the vessel 12 may also involve (be assisted or replaced by) chemicals such as permanganate (or potassium permanganate), hypochlorite (or sodium hypochlorite), perchlorate, and/or hydrogen peroxide (H202), and/or other oxidants. The Oxidation step (I) (Roman numeral one) will also involve measuring ORP and pH to monitor the status of the oxidation of the waste stream 8.

In this regard, as shown by example in the Drawing figure, ORP is measured at ORP measurement station 11 on recycle to the oxidation vessel 12. In so doing the water is recycled through ozone eductor 16b to oxidize the organics and metals in the wastewater from the vessel 12 and thru chiller 18 to maintain a lower temperature for better solubility of ozone using pump 23 or other equivalent conveyance energy or force. It is a teaching of the present invention that the destruction of chelants, such as, for example, EDTA, citric: acid, oxalic acid and others; is necessary within the invention's process to release activity so that this dissolved activity can be removed in a concentrated solid form, and the aqueous phase can be either environmentally released or recycled. As indicated below the stream 8 is communicated or transferred through supply line 22; which, in so doing, provides for transfer of the stream 8 as an oxidized solution from vessel 12 to sorbent treatment area 20. Separation of treatment to a second vessel provides for both increased system throughput and prevents possible sorbent residues from being oxidized by subsequent oxidation treatments that may result in formation of intermediate chemicals that are both difficult to oxidize and that prevent proper sorbent removal in the sorption step II (Roman numeral two).

The pH of the solution to be treated is an important factor in utilization of the ozone in preferred embodiments of the present invention. In the oxidation step I (Roman numeral one), involving the destruction of chelant the pH should preferably be below about 12.5 and more preferably less than (<) about 12 for oxidation of chelants. Higher pH values provide poor utilization of the ozone in oxidation of chelants. Starting pH may be higher if other organics are present and when oxidized reduce the pH to the preferred value prior to the oxidation of the chelants. Otherwise an acid compatible with the system should be added to adjust the pH to this value prior to the start of oxidation of the chelants, if present.

The pH has a large effect on the required ORP to meet the required final oxidation. During the period of initial oxidation of the typical chelants in the concentrate the pH does not change appreciably as chelant structure is broken into smaller chemical components that are not chelating in nature. When the organic from the chelant has been destroyed the pH again begins to lower indicating the production of $CO_2$. At this time the oxidation is often sufficiently complete to permit precipitation of cobalt and other metals and release of other isotopes for removal either by sorbents or selective ion exchange.

With regard to pH controls and Oxidation step I in the present invention, pH control is essential for solubility of some constituents and provides for optimum oxidation. The solubility of some constituents is very sensitive to pH; therefore, either a minimum or maximum pH may be maintained to prevent precipitation of a salt that is not required to be precipitated prior to final discharge or drying. The oxidation process also has an optimum pH target to minimize usage of the oxidant and maximize the rate of oxidation of a given chemical specie. In the method 10 of the invention pH may be adjusted at various points in the oxidation to minimize time without getting outside the solubility range. The oxidation of the chelants is often very slow at a pH outside the optimum range. The pH adjustment may be delayed until low molecular organics and more easily oxidized organics are oxidized so as to shift the pH range into more optimum ranges without chemical addition. Therefore, pH monitoring versus ORP levels during oxidation is essential to know when to add pH adjustment chemicals. A continuous extended period with no pH change but increasing oxidation may indicate entry into the chelant oxidation process, especially when ORP changes slow to a relatively steady increase with no constant decrease in pH. This will normally occur in about the +300 to +1000 mV ORP range depending upon pH. Therefore, as shown by example in the Drawing, if the pH 25 at pH/temperature measurement area 13 is greater than a pH of 12 then the pH should be lowered through the addition of suitable acids at chemical injection skid 15.

Also, in the present invention pH is an indicator when the oxidation of chelants into smaller components is nearing completion, and as oxidation of the smaller components to $CO_2$ begins to lower the pH which has been nearly constant during breaking of the 5 chelants. The breaking of chelants into smaller pieces which no longer can chelate the metals occurs preferentially to oxidation of most of the pieces. This chelant oxidation process is indicated by little or no change in pH. Once a change of about 0.01 to about 0.1 pH unit has occurred greater than (>) about 99.9% of the chelant has already occurred and the radioisotopes can be removed by filtration, sorbents (Step II) and Adjustable and Configurable ion exchange (Step IV).

In a related aspect of the invention the oxidation return line 14a supplies a recycle volume which comes through the heat exchanger 18 to lower the temperature of the recycle volume to a preferred temperature of below about 80 degrees F. (or about 26.67 degrees C.), but preferably closer to about 60 degrees F. (or about 15.56 degrees C.) when possible, before entering the supply line 14 directly or through eductor supply feed 19 and continuing back to the vessel 12 as illustrated schematically in the Drawing. In this manner ozone can be more ideally utilized in lines before and in vessel 12.

The waste stream 8 is pumped, for example by pump 23, or otherwise communicated in oxidation recycle line 22, in a batch sequence, to the recycle sorbent area, vessel or container 20. As shown in the Drawing, line 22 leads to transfer line 21. Transfer line 21, therefore, constitutes a short connector line between oxidation recycle line 22 and central recycle line 38, such that line 38 communicates recycle all the way to the recycle sorbent area or vessel 20. In the sorbent area 20 sorbent substances are added from the sorbent supply area 24 through the supply line 24a, or other means of transfer or communication, and mixed well using mixer 25, or equivalent stirring or mixing means, with the waste stream 8 in the area 20. A number of sorbent substances or materials, and particularly those powdered sorbents preferred for use in the present invention, are available and known in the art which can be utilized in step II. The sorbent could also include ion exchange media especially in a finer mesh size that may not be practical for column polishing. Generally speaking, a sorbent is defined as a substance that has the property of collecting molecules of another subject substance (which, itself, may be mixed with yet further substances not sought for collection) by sorption or by taking up and holding the subject substance by either adsorption or absorption. Sorbents in the present invention are utilized to remove a large percentage of the radioisotopes or other undesirable contaminants rather than using selective ion exchange materials as these sorbents are at least about 10 to 100 times more volume efficient than selective IX materials so that waste volumes for disposal are significantly reduced, thus lowering operating costs. Sorbent substances are chosen and mixed in the container 20 such that the stream 8 is placed in a chemical orientation for ionic removal and such that ionic bonding is formed for longer hold-up in this area when needed. The powdered, granular, liquid ionic flocculent and other forms of sorbents are such that they constitute ion exchange material acting as an absorbent and forming ionic bonds and early-stage particulate. Additionally, in preferred embodiments, precipitate and chemically sorbent solids which are formed in the recycle sorbent vessel 20 are transferred or communicated on/in the solids transfer line 26 to the solids collection tank 28. This process may be repeated sequentially with additional sorbents when needed; i.e., one or more sorbents may be added to the sorbent container 20 in a manner selected to address sorbency-targeting of one or more selected element substances. Such adding of individual sorbents, when chosen, creates a sequential adding of sorbents and sorbent addition strategy to best target element substances in the sorbent container 20 during related or contemporaneous time periods while such element substances are present in the sorbent container 20 and being processed.

The waste stream 8, as treated in the container or area 20, is then pumped or otherwise communicated on the supply line 31 to the subsystem carrying out solid-liquid separation step III, as illustrated schematically in the Drawing. Solids are typically separated using a combination of centrifugal separation and settling (33) and filtration (34). Hydrocyclones, and such like means, are a preferred method for initial separation of sorbents followed by ultrafiltration to remove very fine or colloidal solids. Centrifugal separation is particularly effective at concentrating the solids for disposal. However, it will be understood that other similar means may be used to carry out the same functional purpose.

The filter unit 34, to which the stream 8 is provided by supply line 31; is illustrated representationally as showing an ultrafiltration setup having at least one media or membrane sub-unit. In a preferred embodiment of the invention one or more Tubular Ultrafilter Membranes are utilized although the ultrafiltration employed does not have to be tubular in nature and one or more of such units can be employed. An example of a preferred ultrafiltration unit is the TUF™ System from Diversified Technologies Systems, Inc., in Knoxville, Tennessee. The TUF™ System; i.e., the "Tubular UltraFiltration" System, filters the waste stream 8 to less than about 0.05 micron, and is capable of removing virtually 100% of suspended solids, metal complexes, and most colloidal material from the stream by passing it through a series of cross-flow membranes. As indicated, other types of cross-flow membranes and media can be utilized. Additionally, in a preferred embodiment, the separation and settling device 33, and these types of centrifugal equipment and devices such as a hydrocyclone, can be used in the present method 10 to remove sorbent materials in advance of the filter unit 34 (or ultrafiltration units), to get such solids back out once they had been introduced in the sorption step II.

As illustrated in the Drawing regarding respective recycle lines in preferred embodiments thereof: first recycle line 22A, second recycle line 31A and third recycle line 36A; are provided as a part of the invention's method 10 in preferred embodiments.

Thus, in a preferred embodiment of the invention's method 10 the sorbent treatment area (vessel or container) 20 has three possible recycle paths: first, second and third recycles; depending upon the operation required in the system. The first recycle line 22A before the separation and settling device 33 allows mixing of the sorbent without removal of solids thus utilizing sorbent that may settle into line 31 and assist mixing. The second recycle line 31A provides for removal of sorbents or other solids without filtration. This may be utilized when current sorbent should be removed prior to a subsequent sorbent that is to be added. The third recycle line 36A can utilize both the separation and settling device 33 and the filter unit 34 with the reject being returned through recycle line 36A and line 38 to sorbent treatment area 20 for further processing, with pump 30 providing the motive force. Line 38 can comprise several grouped respective lines for use in different directions as needed. Therefore, if there are no solids present there is no need to remove solids prior to sorbent treatment (20) in the concentrate stream 8 and only one sorbent is utilized in the sorbent treatment area or vessel 20, the first and third recycles (respective lines 22A and 36A) being utilized. If solids are to be removed from initial concentrate stream 8 or if at least two (2) separate sorbent treatment cycles are utilized in the sorbent treatment area or vessel 20; i.e., the first sorbent is removed before utilizing the second (or respective additional) sorbent for absorption of targeted element substances; then the second (2nd) recycle (line 31A) is employed additionally. The separation and settling device 33 can be any of a number of centrifugal separators; for example, units such as a hydrocyclone which is preferred in the embodiments just discussed herein, or a centrifuge or other similar or equivalent type of equipment or other equipment accomplishing a separation function.

In the preferred embodiment illustrated in the Drawing, a further separation and settling device 7 (such as a hydrocyclone or equivalent separation means) is utilized on supply line 14 shortly after leaving stored container area 6 in a sub-step to process and remove solids which are then communicated directly to, or on/in solids transfer line 7T, to the solids collection tank 28. Solids may be removed using solids separator 7, preferably a hydrocylone, during this transfer to decrease the consumption of oxidant, decrease the time for oxidation and eliminate the possibility of release of radioactive isotopes from the solids that later must be removed.

In related preferred embodiments of the invention's method 10, and in the case of the third recycle line 36A, portions of the stream 8 on the rejected side of the filter media 35 are recycled back along the recycle line 36A and the central recycle line 38 to the sorbent treatment area or vessel 20 as illustrated by example in the Drawing illustration. Recycle of the stream 8 through the tubular ultrafilter cleans the membranes resulting in extended membrane life and less maintenance.

Portions of the waste stream 8 on the permeate side of the filter media 35 in the filter unit 34, in the Solid-Liquid Separation step III, are communicated directly to the filter permeate line 40. The line 40 communicates such portions of the waste stream 8, exiting the filter unit 34 to ion exchange units (in preferred embodiments of the invention) comprising the method's (10) Adjustable and Configurable Ion Exchange (IX) step IV. The ion exchange (IX) vessel units, which can number one (1) or more, are shown representationally by example connected in series by manifold lines as illustrated in the Drawing in connecting and affording the ion exchange (IX) units selective, adjustable and configurable bypass options in transporting the stream 8 in relation to one another in an exemplar alignment as follows: the 25 first IX vessel 42, the first IX manifold line 43, the second IX vessel 44, the second manifold line 45, the third IX vessel 46, the third manifold line 47, the fourth IX vessel 48 and the fourth manifold line 49. The first IX vessel 42 is supplied with the stream 8 from the filter permeate line 40; and the last (fourth) IX vessel 48, in this case shown by example in the Drawing, is connected to the IX effluent line 51. The manifold lines 43, 45, 47 and 49, functionally manifested as the manifold system 41, is installed and positioned, and functions within the Adjustable and Configurable ion exchange (IX) step IV, such that the manifold lines 43, 45, 47 and 49 extend and connect to the respective IX vessels 42, 44, 46 and 48, as well as communicating with the filter permeate line 40 and the IX effluent line 51; as 10 illustrated by example in the Drawing. Each of the manifold lines; 43, 45, 47 and 49 can also be regarded functionally and structurally in the present invention as an influent/effluent header with bypass connection line. Each of the manifold lines (43, 45, 47 & 49), which can also be described as influent/effluent manifold lines, consists of 15 an H-shaped (i.e., configuration of the alphabetical letter "H" when viewed from at least one axis of sight) piping structure that has valves on piping running into (influent) and out (effluent) of the vessel. These are normally in an open position when the vessel is in service. A valve is also located on the cross piping between the influent and effluent and is called the bypass valve. The bypass valve is normally closed during vessel use. If the vessel is to be bypassed the bypass valve is opened and the influent and effluent valves are closed thus bypassing flow to the vessel, and facilitating the selection and adjustable or configurable alignment of those vessels to be specifically employed during this step when in use in the field.

Thus, collectively, the manifold system 41 permits the ionic exchange (IX) vessels (as shown in this example of the present invention as 42, 44, 46 and 48) to be entered into flow path or removed without changing piping. Thus media in the vessels will not be exposed to wastewater that does not require further removal of a given isotope; or, when completely expended, can be removed from the flow path for media removal in step IV. It will be appreciated that elements of the manifold system 41 can be positioned, structured and/or connected to accommodate any number of vessel units utilized in the Adjustable and Configurable ion exchange (IX) step IV, and that a number of different means and structural orientations and positions can be utilized in carrying out the method's bypass function in relation to the IX vessel units utilized to carry out step IV and the selection choice of those IX vessels (for example 42, 44, 46 and/or 48) to actually be used in step IV when the system (10) is in operation in the field.

It will also be appreciated that a number of IX arrays, sequences and connections can be utilized in the equipment carrying out the ion exchange (IX) step IV. One such arrangement in a preferred embodiment of the invention employs the equipment illustrated in the Drawing. The ion exchange step IV can employ media addressing additional removal to that of Cesium. It can clear water of all Cobalt and other targeted isotopes, such as media to address any Antimony, Cesium and other isotopes. It will be understood that a number of substances in media can be employed including, but not limited to, bead resin, zeolite and others.

The fifth overall step (V) of the present invention's method; involving Discharge of Water Va or Drying of resulting dissolved solids to Dry Solids Vb, as illustrated by example in the Drawing figure; involves communicating the resulting stream 8 from the $4t^h$ IX vessel 48, last IX vessel in the selected array of such units (in the exemplar case, the fourth IX vessel 48) or the last of such units utilized or chosen; to the IX effluent line 51 leading, or directly, to the monitor tank 50. The various chemicals remaining in the water (i.e. for example: sodium borate, sodium sulfate, permanganates, nitrates and chlorides) represent the dissolved solids. The water which has had the radioisotopes removed must be analyzed for isotopic content before being released to the environment to assure that discharge limits are met; so the water is held in the monitor tank 50 before either being discharged or sent to the evaporation step Vb.

Clean, environmentally suitable, discharged water therein, and in preferred embodiments so confirmed by analysis, can, therefore, be released and discharged Va to the environment. This process is capable of releasing to the environment essentially about 100% of the dissolved concentrate. An alternative pathway of the discharged stream in the tank 50 can be transferred or communicated by evaporator feed line 53 to the evaporator unit 54 for drying of dissolved solids (Vb), producing non-radioactive industrial disposal solid waste material and dischargeable evaporate condensate and release of the vapor to the atmosphere. In so doing, the overall temperature range in step Vb will be from greater than or equal to about 100 deg. C. to a temperature of less than or equal to about 240 deg. C. In the present invention it is preferred to utilize a center temperature of greater than or equal to about 100 deg. C. for general water removal; and a temperature range of greater than about 100 deg. C to about 240 deg. C. for water of hydration removal. In the present method 10 an example of preferred equipment utilized to carry out evaporation in the unit 54 is the DrumDryer™ manufactured by Diversified Technologies Services, Inc., Knoxville, Tenn./USA, which minimizes the volume of the dried product by producing a dense hard product with minimal voids. A number of other types of means and equipment can also be used to carry out the evaporation function of the evaporator unit 54. The evaporate is very high quality water produced from the evaporator unit 54 which is devoid of dissolved solids. The evaporate from the evaporator unit 54 is conveyed or sent by line 57b to be discharged to the environment as part of Step Va on line 57a or optionally or selectively recycled to the plant by reuse line 60 or other means which may occur in some applications.

The pH can also be a valuable tool in optimizing the rate of drying and minimizing the final dried volume. For example, in the presence of boron a pH of greater than about 12 is desirable to maximize solubility of boron prior to precipitation with optimum pH of about 12.5 to about 13. The higher pH maximizes the solubility of the boron thus preventing premature precipitation resulting in poor heat transfer. This maximizes the heat transfer of the liquid from the heating surfaces even though the liquid becomes very viscous. Therefore, when evaporation is finally minimized as the solution approaches solubility at the elevated temperature, simple removal of heat causes the thick solution to crystallize as the temperature lowers. All remaining water is chemically bound in the crystalline structure.

Accordingly, in a preferred embodiment of the invention, the concentrate with a majority of boron prior to drying should be increased to maximize solubility before entry into the evaporator unit 54 to maximize drying efficiency. Caustic is added through pH adjustment station 52 to reach desired pH value at pH measurement station 56 during recycle on transfer line 50R with pump 55. In the case of sulfate systems the pH may need to be adjusted to the acid side to obtain the same effect.

The elevated pH also minimizes nucleate boiling that causes spattering which results in salt buildup in the fill head.

Additionally, preferred embodiments of the present invention's method 10 include process controls 70 for remotely carrying out functional steps and sub-steps of the invention by computer and electronic means.

Therefore, the operation of the invention 10 can normally be conducted remotely and often under automatic computer control to minimize radiological exposure and minimize operator time demands. The potential dose of some of these components can cause dangerous exposure to personnel. Although shielding can minimize exposure long-term exposure is still a concern. Thus, remote operations for most activities can be employed in preferred embodiments by the invention 10. The use of automated valves, remote controlled motors and feeders, sensors with remote displays and connections to process logic controller or PLC are therefore encompassed within the invention's method 10. Also, these controls can activate and control oxidation monitoring and completion, sorbent addition, level, volume and weight, pressure on filtration, and evaporation.

The PLC is a computer programmed to control all the major functions of the system in the sequence required for safe startup, operation and shutdown of the invention's system. This minimizes the operators that must monitor the system and nearly eliminates operator radiological exposure. The PLC is also a better means of optimizing system operation through programmed analogs that would otherwise be more difficult for operators to implement, requiring extensive training.

The PLC monitors parameters every few seconds and is able to recognize and correct operational problems, send warning and alarms and safely shutdown the system. Optimization of operations can occur by changing pump speeds, valve positions, and addition of chemicals for pH or foaming problems.

The PLC is interfaced by use of a Human Machine Interface or HMI which utilizes a dedicated local screen or one or more remote computer screens on computers that may be located in a control room. Such computers can also be located anywhere in the plant or world through internet connections. This permits supervisors, management and equipment supplies to remotely monitor the system for proper operation and further optimization.

The HMI is also capable of recording data from the system for permanent record, for trending system parameters and for generating management reports for the invention's system operation. These trends and reports can warn management of upcoming maintenance requirements. Even issues like membrane cleaning can be handled automatically between batch operations.

In another included use of the present invention the removal of C-14, a radioactive isotope of Carbon, thought or known to exist in the subject wastestream (8), in a preferred embodiment of the present invention is accomplished before the attainment of the final dried product by chemical treatment in the sorbent vessel, or the environment of step (II) through the addition of a soluble calcium salt 71, including CaCl2, Ca(NO3)2, and other such salts; probably in liquid form (but not required); that results in the precipitation of calcium carbonate finally being removed with other sorbent solids. Removing C-14 important as a use of the present invention, and objective thereof, in that a very limited amount of C-14 is permitted to be present in the DrumDryer or drying solids in step Vb of the invention to obtain free release to the environment (under existing environmental regulations). Typical C-14 isotope and Citric Acid (and other chelants and organics) are known to exist in waste waters of nuclear facilities in concentration or levels greater than would be an acceptable by those skilled in the art at least in areas such as Russia (e.g., Russian designed VVER), Slovakia and other countries. C-14 can come from almost any organic present in the primary water that passes through the reactor during the fission reactions. In the present invention the use of Ozone in the present invention destroys all the organics. As it has been determined that citric acid and oxalic acid are chelants that hold Cs, Co, Sb and others in solution it must be destroyed to release the isotopes.

Generally speaking, C-14 requires special analytical techniques to identify its presence, and C-14 is one of a number of other substances that might be a part of the incoming wastestream, which are not easily identified using normal gamma, beta and alpha analysis; but, are understood by those skilled in certain areas of the world to often be a radwaste constituent. However, when the presence of such a substance is suspected or known the present invention can be utilized to remove them. For example, in the U.S. the presence of C-14 may not be inherently understood by one skilled in the art, as the U.S. does not normally use C-14 substances, while countries like Russia and Slovakia, responsive to organizations like the EU, or other countries, might well use these substances in the primary water of a NPP or similar Boron wastestream. The fact that countries such as Russia and Slovakia may have to account for C-14, or other such substances, and the effect that it would have on overall processing, is, thus, considered an additional use to be indicated within the scope of the present invention when this occurs in the NPP original wastestream addressed by the present invention.

The removal of C-14 in the Ozone Recycle Vessel, or as a part of step (I), is an alternate method utilized in the present invention, by first lowering the pH (or applying a pH adjustment) 72 to a range of about 5 to about 7, or about, or approximately, 6 where solubility of $CO_2$ is minimized and carbonic acid is not readily formed. The pH adjustment can be made either before 73 or after 74 oxidation with ozone in step (I) that destroys the organic containing the C-14. Preferable pH adjustment would be before oxidation due to immediate release to the gaseous phase where some C-14 would be swept out with the oxygen and unreacted ozone. The lower pH may also aide the rate and efficiency of ozone oxidation. After the ozonation is complete the vessel would be subjected to evacuation 75 to a preferred vacuum level range of about 18 in. to about 28 in. Hg vacuum, or lower than about 20 in. Hg, or a range of about 20 in. Hg to a range of about 28 in. Hg; if needed, to cause the $CO_2$ to effervesce from the liquid along with oxygen and ozone, thus removing C-14 from the liquid. It has the added benefit of also removing ozone and oxygen from the liquid thus potentially eliminating the step of passing the liquid through a carbon bed to destroy the ozone. A flow through degassifier which operates with vacuum could also be utilized in evacuation 75 instead of directly applying vacuum to the vessel. The degassifier uses a gas permeable membrane and the vacuum is applied on the gaseous side of the membrane. As a part of step 72 (73 and 74), the pH must then returned to an acceptable level after evacuation 75 to reconvert the boric acid to sodium borate so that any dissolved boric acid/sodium borate is not removed in the following process step.

The water or wastestream could be provided as boric acid or as sodium borate depending upon the type of plant or facility involved. If the sodium borate is the feed source, the pH must be lowered to 5-7 in order to be at a pH that will release the generated carbon dioxide to the atmosphere as gas rather than convert the carbon dioxide to bicarbonate or carbonate at higher pH. At a lower pH than 5 the carbon dioxide is converted to carbonic acid that increases the solubility of carbon dioxides.

Sodium borate is much more soluble than boric acid. The solubility curve for boron reaches a minimum around a pH of 7. This means that some boron will likely precipitate out at a pH of 6. To prevent removal of the boron with the precipitating sorbents the pH must be raised back to a pH greater than (>) 11-12 to resolubilize the boron as sodium borate. The addition of sodium or potassium hydroxide quickly dissolves the boric acid as sodium or potassium borate.

While the preferred embodiment of the invention has been illustrated and described, it will be appreciated that various changes can be made therein without departing from the spirit and scope of the invention.

We claim:

1. A process for treating a liquid or aqueous wastestream consisting at least one of a group of wastes consisting of radioactive concentrate fluid, historic waste and other forms of environmental or hazardous waste or radwaste; and converting the wastestream into at least one of two selected forms including a form which is a solidified form for safe disposal and an aqueous form, which can be safely discharged to the environment, said process comprising the steps, designated as Roman numerals: I, II, III, IV and V, of:

(I) oxidizing the wastestream via addition of an oxidant to the wastestream such that any existing chelant material or substance contained in the wastestream is rendered non-effective as a chelant of metals or destroyed thereby releasing the metals into ionic form, and the wastestream is rendered subject to, or permissive of, precipitation of cobalt and other metals and release of isotopes for removal;

(II) mixing the wastestream with at least one target Sorbent material such that isotopes are removed from the wastestream;

(III) separating the wastestream into Solid and Liquid components;

(IV) treating the wastestream by Selective Ion Exchange (IX); and (V) final processing, wherein at least one step is chosen from a group consisting of:

(Va) discharging the wastestream in said aqueous form, and (Vb) drying of a resulting wastestream having dissolved solids to Dry Solids, as said solidified form;

wherein, step (I) is an Oxidation or Ozone Oxidation step, further comprising the substeps of:

communicating the wastestream from a stored location through a first hydrocyclone, whereat a solids partition of the wastestream is conveyed to a solids collection tank, and a remaining part of the wastestream is conveyed to a recycle oxidation vessel for processing therein, conveying the wastestream after processing in the recycle oxidation vessel to a pH and temperature measurement area and ORP measurement station, and transferring at least part of the wastestream to a heat exchanger, the heat exchanger communicating with an eductor supply feed and an ozone eductor and mixing equipment through which the wastestream is communicated to an oxidation return line back in recycle to the recycle oxidation vessel, said oxidation return line further communicating with and being contemporaneously served by a chemical injector;

wherein, step (II) is a Sorption or Powder Sorbent isotope removal step, further comprising the substeps of:

marshaling at least a part of the remaining wastestream not being transferred to the heat exchanger, and transferring the remaining wastestream to a sorbent treatment area, selecting at least one sorbent substance to remove at least one subject target element or isotope forming a part of the wastestream transferred to the sorbent treatment area, adding the at least one sorbent substance selected to the sorbent treatment area and mixing it therewithin, and coordinating at least one further substep selected from a group comprising repeating the selecting at least one sorbent substance until sufficient time has passed to absorb the target element or isotope forming a part of the wastestream, and recycling the wastestream transferred to the sorbent treatment until sufficient time has passed to absorb the target element or isotope forming a part of the wastestream, wherein said at least one sorbent substance is selected from a group consisting of powdered, granular, or liquid ionic flocculent and other forms of sorbents:

communicating the wastestream from the sorbent treatment area to a second hydrocyclone. wherein at least a portion of the wastestream is separated out to a solid material, and wherein, between the sorbent treatment area and the second hydrocyclone communicating a first recycle line to the sorbent treatment area, when selected, of a portion of the wastestream chosen not to pass through the second hydrocyclone, transferring the solid material from the second hydrocyclone to the solids collection tank, and transferring the remaining wastestream from the second hydrocyclone to a filter unit, and wherein, between the second hydrocyclone and the filter unit communicating a second recycle line to the sorbent treatment area, when selected, of a portion of the wastestream chosen not to pass through the filter unit.

2. The process of claim 1, wherein, as a part of step (I) the wastestream is conveyed or transferred from a stored location to a recycle oxidation vessel; and wherein, during a contemporaneous period of time during or after said wastestream being conveyed or transferred the wastestream is recycled from and returning to the recycle oxidation vessel, said recycle oxidation vessel being selectively served by a heat exchanger when required to adjust the temperature to a more favorable oxidation range; and wherein a pH and temperature measurement area and ORP measurement station are utilized for measurement purposes to determine further treatment required.

3. The process of claim 2, wherein the pH of the wastestream is determined and adjustment performed using a chemical injector.

4. The process of claim 2, wherein, an antifoaming agent is utilized, said agent being provided through the chemical injector.

5. The process of claim 3, wherein, the pH is below about 12.5.

6. The process of claim 4, wherein an ORP of the wastestream is from about +300 mV to about +1000 mV after adjustment for the pH.

7. The process of claim 2, wherein the heat exchanger operates to lower the temperature of the wastestream to a temperature of less than about 80 degrees F. or about 27 degrees C.

8. The process of claim 2, wherein the heat exchanger operates to lower the temperature of the wastestream to a temperature of less than or equal to about 60 degrees F. or about 16 degrees C.

9. A process for treating a liquid or aqueous wastestream consisting of at least one of a group of wastes consisting of radioactive concentrate fluid, historic waste and other forms of environmental or hazardous waste or radwaste; and converting the wastestream into at least one of two selected forms consisting of a form which is evaporated to a solidified form which can be safely discharged to an industrial or plant facility and an aqueous form which can be safely discharged to the environment; said process comprising the steps, designated as Roman numerals: I, II, III, IV and V, of:
- (I) oxidizing the wastestream via addition of an oxidant to the wastestream such that any existing chelant material, or substance contained in the wastestream is rendered non-effective as a chelant of metals or destroyed, and the wastestream is rendered subject to, or permissive of, precipitation of cobalt and other metals and release of isotopes for removal or ion exchange;
- (II) mixing the wastestream with at least one target Sorbent material such that isotopes are removed from the wastestream;
- (III) separating the wastestream into Solid and Liquid components;
- (IV) treating the wastestream by Selective Ion exchange (IX), and
- (V) final processing, wherein at least one step is chosen from a group consisting of:
    - (Va) discharging the wastestream in said aqueous form, and
    - (Vb) drying of a resulting wastestream having dissolved solids to Dry Solids, as said solidified form;

wherein, step (I) is an Oxidation or Ozone Oxidation step, further comprising the substeps of:

communicating the wastestream from a stored location through a first hydrocyclone, whereat a solids partition of the wastestream is conveyed to a solids collection tank, and a remaining part of the wastestream is conveyed to a recycle oxidation vessel for processing therein, conveying the wastestream after processing in the recycle oxidation vessel to a pH and temperature measurement area and ORP measurement station, and transferring at least part of the wastestream to a heat exchanger, the heat exchanger communicating with an eductor supply feed and an ozone eductor and mixing equipment through which the wastestream is communicated to an oxidation return line back in recycle to the recycle oxidation vessel, said oxidation return line further communicating with and being contemporaneously served by a chemical injector;

wherein, step (II) is a Sorption or Powder Sorbent isotope removal step, further comprising the substeps of:

marshaling at least a part of the remaining wastestream not being transferred to the heat exchanger, and transferring the remaining wastestream to a sorbent treatment area, selecting at least one sorbent substance to remove at least one subject target element or isotope forming a part of the wastestream transferred lo the sorbent treatment area, adding the at least one sorbent substance selected to the sorbent treatment area and mixing it therewithin. and coordinating at least one further substep selected from a group comprising repeating the selecting at least one sorbent substance until sufficient time has passed to absorb the target element or isotope forming a part of the wastestream, and recycling the wastestream transferred to the sorbent treatment area until sufficient time has passed to absorb the target element or isotope forming a part of the wastestream, wherein said at least one sorbent substance is selected from a group consisting of powdered, granular, or liquid ionic flocculent and other forms of sorbents;

communicating the wastestream from the sorbent treatment area to a second hydrocyclone, wherein at least a portion of the wastestream is separated out to a solid material and wherein, between the sorbent treatment area and the second hydrocyclone communicating a first recycle line to the sorbent treatment area, when selected, of a portion of the wastestream chosen not to pass through the second hydrocyclone, transferring the solid material from the second hydrocyclone to the solids collection tank, and transferring the remaining wastestream from the second hydrocyclone to a filter unit, and wherein, between the second hydrocyclone and the filter unit communicating a second recycle line to the sorbent treatment area, when selected, of a portion of the wastestream chosen not to pass through the filter unit.

10. The process of claim 9, wherein as a part of step (II), one sorbent material is added and mixed in the sorbent treatment area, and the first recycle line to the sorbent treatment area being selected and repeated until sufficient time has passed to absorb the at least one target element or isotope.

11. The process of claim 9, wherein as a part of step (II), the second recycle line being utilized for removal of sorbents and other solids without passing such materials through the filter unit, and being utilized when a sorbent currently being used is required to be removed prior to a subsequent sorbent being added to the sorbent treatment area.

12. The process of claim 9, wherein, step (III) is a Solid-Liquid Separation step further comprising the substeps of:

filtering the remaining wastestream through a filter media of the filter unit, communicating with a rejected side of the filter media a third recycle line to the sorbent treatment area, for recycling at least a part of the wastestream, not passing through the filter media, to the sorbent treatment area, and contemporaneously directing at least a part of the wastestream, passing through the filter media to a manifold system.

13. The process of claim 12, wherein the wastestream processes through the second hydrocyclone and to the filter unit, and wherein a reject portion from the reject side of the filter media of the filter unit being returned through the third recycle line to the sorbent treatment area for further processing.

14. The process of claim 12, wherein, when no solids are present in the wastestream and there is no need to remove solids prior to passage through sorbent treatment area, and only one sorbent is utilized in the sorbent treatment area, the first recycle line and the third recycle line to the sorbent treatment area are utilized.

15. The process of claim 12, wherein, when at least two separate processing passes of the wastestream through the sorbent treatment area are selected and utilized or a first sorbent is removed from the sorbent treatment area before adding and using a second or respective additional sorbent for absorption of target elements or isotopes, then the second recycle line to the sorbent treatment area is utilized.

16. The process of claim 12, wherein, adding at least one sorbent to the sorbent treatment area in a manner selected to address sorbency-targeting of at least one target element or isotope such that said adding of respective individual sorbents when chosen creates a sequential adding of sorbents and sorbent addition strategy to best absorb the target element or isotope in the sorbent treatment area during related or contemporaneous time periods while the target element or isotope is present in the sorbent treatment area.

17. The process of claim 12, wherein, step (IV) is an Adjustable and Configurable Ion exchange (IX) step further comprising:

processing the wastestream passing into the manifold system by selective removal of isotopes, wherein the manifold system comprises at least one vessel unit for ion exchange, the vessel unit being served and connected to at least one manifold line, and wherein one or more of such vessel units are selectively deployable in series, and adjustable and configurable through by-pass function, in determining flow path and selective IX treatment through the manifold system, and exiting the remaining wastestream from the manifold system to an IX effluent line.

18. The process of claim 17, wherein, as a part of said step (V), the substeps comprise:

conveying the remaining wastestream on the IX effluent line to a monitor tank, passing at least a portion of the remaining wastestream from the monitor tank to at least one of the group consisting of:

the Wastestream Discharge (Va), and the Drying of resulting wastestream dissolved solids (Vb); and contemporaneously guiding at least a part of the remaining wastestream through a recycling subprocess where the wastestream is returned to the monitor tank.

19. The process of claim 18, wherein:

the Wastestream Discharge (Va) comprises at least a discharge line, said discharge line discharging the remaining wastestream as clean water to the environment; and the Drying of resulting wastestream dissolved solids (Vb) comprises at least an evaporator feed line of at least a part of the remaining wastestream from the monitor tank, an evaporator unit in communication with the evaporator feed line, and a line connected to the evaporator unit for selective recycle back to the stored location.

20. The process of claim 19, wherein:

the recycling subprocess comprises at least:

a monitor tank recycle line for communicating and transferring the at least part of the remaining wastestream from the monitor tank to the IX effluent line, a chemical injector in communication with the IX effluent line, and a pH measurement area in communication with the IX effluent line, before the wastestream is transferred to the IX effluent line and returned to the monitor tank.

21. The process of claim 12, wherein the process is coordinated and controlled as to each process step by a process logic controller.

22. A process for treating a liquid or aqueous wastestream when internally enclosed within a treatment environment, the wastestream consisting of at least one of a group of wastes consisting of radioactive concentrate fluid, historic waste and other forms of environmental or hazardous waste or radwaste; and converting the wastestream into at least one of two selected forms including a form which is evaporated to a solidified form which can be safely discharged to an industrial or plant facility, and an aqueous form which can be safely discharged to the environment, said process comprising the steps of:

(I) oxidizing the wastestream through a factor of pH adjustment such that any existing chelant material, or substance thereof, is rendered non-effective as a chelant of metals or destroyed, whereby pH is lowered and rendered unchanging and $CO2$ is produced, and the wastestream is rendered subject to or permissive of, by virtue of the absence of binding chelant, precipitation of cobalt and other metals and release of isotopes for removal or ion exchange;

(II) mixing the wastestream with at least one target Sorbent material such that isotopes are removed from the wastestream;

(III) separating the wastestream into Solid or Liquid components;

(IV) treating the wastestream by Selective Ion exchange (IX); and (V) final processing, wherein at least one step is chosen from a group consisting of:

(Va) discharging the wastestream in said aqueous form, and (Vb) drying of a resulting wastestream having dissolved solids to Dry Solids, as said solidified form;

wherein, step (I) is an Oxidation or Ozone Oxidation step, further comprising the substeps of:

communicating the wastestream from a stored location through a first hydrocyclone, whereat a solids partition of the wastestream is conveyed to a solids collection tank, and a remaining part of the wastestream is conveyed to a recycle oxidation vessel for processing therein, conveying the wastestream after processing in the recycle oxidation vessel to a pH and temperature measurement area and ORP measurement station, and transferring at least part of the wastestream to a heat exchanger, the heat exchanger communicating with an eductor supply feed and an ozone eductor and mixing equipment through with the wastestream is communicated to an oxidation return line back in recycle to the recycle oxidation vessel, said oxidation return line further communicating with and being contemporaneously served by a chemical injector;

wherein, step (II) is a Sorption or Powder Sorbent isotope removal step, further comprising the substeps of:

marshaling at least a part of the remaining wastestream not being transferred to the heat exchanger, and transferring the remaining wastestream to a sorbent treatment area, selecting at least one sorbent substance to remove at least one subject target element or isotope forming a part of the wastestream transferred to the sorbent treatment area, adding the at least one sorbent substance selected to the sorbent treatment area and mixing it therewithin, and coordinating at least one further substep selected from a group comprising repeating the selecting at least one sorbent substance until sufficient time has passed to absorb the target element or isotope forming a part of the wastestream, and recycling the wastestream transferred to the sorbent treatment until sufficient time has passed to absorb the target element or isotope forming a part of the wastestream, wherein said at least one sorbent substance is selected from a group consisting of powdered, granular, or liquid ionic flocculent and other forms of sorbents;

communicating the wastestream from the sorbent treatment area to a second hydrocyclone, wherein at least a portion of the wastestream is separated out to a solid material, and wherein, between the sorbent Treatment area and the second hydrocyclone communicating a first recycle line to the sorbent treatment area, when selected, of a portion of the wastestream chosen not to pass through the second hydrocyclone, transferring the solid material from the second hydrocyclone to the solids collection tank, and transferring the remaining wastestream from the second hydrocyclone to a filter unit, and wherein, between the second hydrocyclone and the filter unit communicating a second recycle line to the sorbent treatment area, when selected, of a portion of the wastestream chosen not to pass through the filter unit.

23. The process according to claims 1, 9, or 22, wherein, the wastestream contains C-14; and
wherein, in step (II), further comprising adding as a part of the mixing at least one substance selected from a group of substances consisting of a) CaCl2, b) Ca(NO3)2 and c) other soluble calcium salts.

24. The process according to claims 1, 9 or 22, wherein, the wastestream contains C-14, and further comprising:
prior to step (I), lowering the wastestream to a pH range of about 5 to about 7, and rendering the treatment environment such that it can be evacuated at a vacuum up to about 28 in. Hg.; and
returning the pH to a level to reconvert a boric acid volume to a sodium borate volume so that any dissolved boric acid/sodium borate is not removed in step (I).

25. The process according to claims 1, 9, or 22, wherein, the wastestream contains C-14; and further comprising:
after step (I), lowering the pH of the wastestream to a pH range of about 5 to about 7, and rendering the treatment environment such that it can be evacuated at a vacuum up to about 28 in. Hg.; and
returning the pH to a level to reconvert a boric acid volume to a sodium borate volume so that any dissolved boric acid/sodium borate is not removed in step (II).

26. The process according to claims 1, 9, or 22, wherein, the wastestream contains C-14; and further comprising:
after step (I), lowering the pH of the wastestream to a pH range of about 5 to about 7, and rendering the treatment environment such that it can be evacuated through a degassifier with vacuum; and
returning the pH to a level to reconvert a boric acid volume to a sodium borate volume so that any dissolved boric acid/sodium borate is not removed in step (I).

27. The process according to claims 1, 9 or 22, wherein, the wastestream contains C-14; and further comprising:
after step (I), lowering the pH of the wastestream to a pH range of about 5 to about 7, and rendering the treatment environment such that it can be evacuated through a degassifier with vacuum; and
returning the pH to a level to reconvert a boric acid volume to a sodium borate volume so that any dissolved boric acid/sodium borate is not removed in step (II).

28. The process according to claims 1, 9 or 22, wherein, just prior to the final processing step (V), placing the resulting wastestream in a monitor tank where the wastestream can be analyzed for isotopic content.

29. The process according to claim 1, 9 or 28, wherein, in the drying step (Vb) the wastestream is brought to a temperature range of greater than or equal to about 100 degrees C. to a temperature of less than or equal to about 240 degrees C.

30. A process for treating a liquid or aqueous wastestream comprising at least one of a group of wastes consisting of radioactive concentrate fluid, historic waste and other forms of environmental or hazardous waste or radwaste product from a nuclear facility; inherently containing when present, without specific addition, chelant and organics; and
converting the wastestream into at least one of two selected forms including a form which is a solidified form for safe disposal and an aqueous form which can be safely discharged to the environment, the process comprising the steps designated as Roman numerals: I, II, III, IV and V, of:

(I) ozone oxidizing the wastestream through temperature mediated ozonation in a temperature range of from about 55 degrees F., or about 12.7 degrees C., to about less than or equal to about 65 degrees F., or about 18.3 degrees C., such that any existing chelant chemical compound or organic substance contained in the wastestream is rendered non-effective as a chelant of metals or destroyed thereby releasing the metals into ionic form for treatment in the process with the steps II, III, IV and V:
(II) mixing the wastestream with at least one target Sorbent material such that isotopes are removed from the wastestream;
(III) separating the wastestream into Solid and Liquid components;
(IV) treating the wastestream by Selective Ion exchange (IX); and
(V) final processing, wherein at least one step is chosen from a group consisting of:
(Va) discharging the wastestream in said aqueous form, and
(Vb) drying of a resulting wastestream having dissolved solids to Dry Solids, as said solidified form; and
wherein at least one substep is chosen from a group, when the wastestream contains C-14, consisting of:
in step (II), further comprising adding as a part of the mixing at least one substance selected from a group of substances consisting of a) CaCl2, b) Ca(NO3)2 and c) other soluble calcium salts,
prior to step (I), lowering the pH of the wastestream to a pH range of about 5 to about 7, and rendering a wastestream processing environment such that it can be evacuated at a vacuum up to about 28 in. Hg., and returning the pH to a level to reconvert a boric acid volume in the wastestream to a sodium borate volume, so that any dissolved boric acid/sodium borate is not removed in step (II),
after step (I), lowering the pH of the wastestream to a pH range of about 5 to about 7, and rendering a wastestream processing environment such that it can be evacuated at a vacuum up to about 28 in. Hg,; and returning the pH to a level to reconvert a boric acid volume in the wastestream to a sodium borate volume, so that any dissolved boric acid/sodium borate is not removed in step (II),
prior to step (I), lowering the pH of the wastestream to a pH range of about 5 to about 7, and rendering a wastestream processing environment such that it can be evacuated through a degassifier with vacuum; and returning the pH to a level to reconvert a boric acid volume in the wastestream to a sodium borate volume, so that any dissolved boric acid/sodium borate is not removed in step (I),
after step (I), lowering the pH of the wastestream to a pH range of about 5 to about 7, and rendering a wastestream processing environment such that it can be evacuated through a degassifier with vacuum; and returning the pH to a level to reconvert to a boric acid volume in the wastestream to a sodium borate volume, so that any dissolved boric acid/sodium borate is not removed in step (II),
just prior to the final processing step (V), placing the resulting wastestream in a monitoring tank where the wastestream can be analyzed for isotopic content, and
in the drying step (Vb) the wastestream is brought to a temperature range of greater than or equal to about 100 degrees C. to a temperature of less than or equal to about 240 degrees C.; and wherein, chelant and organics when present, being one or more of a group consisting of EDTA, citric acid, LOMI solution, and other chelants.

31. A process for treating a liquid or aqueous wastestream, when internally enclosed within a treatment environment substantially eliminating foam generated during processing, the wastestream consisting of at least one of a group of wastes consisting of radioactive concentrate fluid, historic waste and other forms of environmental or hazardous waste or radwaste product from a nuclear facility; inherently containing, without specific addition to said process, chelant and organics; and converting the wastestream into at least one of two selected forms including a form which is evaporated to a solidified form which can be safely discharged to an industry or plant facility, and an aqueous form which can be safely discharged to the environment, said process comprising the steps of:

(I) ozone oxidizing the wastestream through a factor of pH adjustment and temperature mediated ozonation such that any existing said chelant and organics thereof are rendered non-effective as a chelant of metals or destroyed, whereby pH of the wastestream is lowered and rendered unchanging and $CO_2$ is produced, and the wastestream is rendered subject to or permissive of, by virtue of the absence of any existing binding chelant, treatment by the following steps (II), (III), (IV) and (V); a temperature range of the ozone oxidizing being in a range of from about 55 degrees F. or about 13 degrees C. to less than or equal to about 80 degrees F. or about 27 degrees C.;

(II) mixing the wastestream with at least one target Sorbent material such that isotopes are removed from the wastestream;

(III) separating the wastestream into Solid and Liquid components;

(IV) treating the wastestream by Selective Ion exchange (IX); and (V) final processing, wherein at least one step is chosen from group consisting of:
(Va) discharging the wastestream in said aqueous form, and
(Vb) drying of a resulting wastestream having dissolved solids to Dry Solids, as said solidified form;

wherein at least one substep is chosen from a group, when the wastestream contains C-14, consisting of:

the process being subject to control through eliminating foam generated during processing; and, wherein, further including adding an anti-foaming agent to a recycle oxidation vessel in step (I), in step (II), further comprising adding as a part of the mixing at least one substance selected from a group of substances consisting of a) $CaCl_2$, b) $Ca(NO_3)_2$ and c) other soluble calcium salts, prior to step (I), lowering the pH of the wastestream to a pH range of about 5 to about 7, and rendering a wastestream processing environment such that it can be evacuated at a vacuum up to about 28 in. Hg., and returning the pH to a level to reconvert a boric acid volume in the wastestream to a sodium borate volume, so that any dissolved boric acid/sodium borate is not removed in step (I), after step (I), lowering the pH of the wastestream to a pH range of about 5 to about 7, and rendering a wastestream processing environment such that it can be evacuated at a vacuum up to about 28 in. Hg.; and returning the pH to a level to reconvert a boric acid volume in the wastestream to a sodium borate volume, so that any dissolved boric acid/sodium borate is not removed in step (II), prior to step (I), lowering the pH of the wastestream to a pH range of about 5 to about 7, and rendering a wastestream processing environment such that it can be evacuated through a degassifier with vacuum; and returning the pH to a level to reconvert a boric acid volume in the wastestream to a sodium borate volume, so that any dissolved boric acid/sodium borate is not removed in step (I), after step (I), lowering the pH of the wastestream to a pH range of about 5 to about 7, and rendering a wastestream processing environment such that it can be evacuated through a degassifier with vacuum; and returning the pH to a level to reconvert a boric acid volume in the wastestream to a sodium borate volume, so that any dissolved boric acid/sodium borate is not removed in step (II), just prior to the final processing step (V), placing the resulting wastestream in a monitor tank where the wastestream can be analyzed for isotopic content, and in the drying step (Vb) the wastestream being brought to a temperature range of greater than or equal to about 100 degrees C. to a temperature of less than or equal to about 240 degrees C.

32. A process for treating a liquid or aqueous wastestream, the wastestream comprising at least one of a group of wastes consisting of radioactive concentrate fluid, historic waste and other forms of environmental or hazardous waste or radwaste product from a nuclear facility; inherently containing when present, without specific addition to said process, chelant and organics; and converting the wastestream into at least one of two selected forms including a form which is evaporated to a solidified form which can be safely discharged to an industrial or plant facility, and an aqueous form which can be safely discharged to the environment, said process comprising the steps of:

(I) ozone oxidizing the wastestream using a recycle oxidation vessel having incoming and outgoing lines and a recirculation loop, through a factor of pH adjustment and temperature mediated ozonation such that any existing said chelant and organics thereof, are rendered non-effective as a chelant of metals or destroyed, whereby pH is lowered and rendered unchanging and a $CO_2$ gas is produced, and the wastestream is rendered subject to or permissive of, by virtue of an absence of binding chelant, treatment of cobalt and other metals isotopes by following steps (II), (III), (IV) and (V), a temperature range of the ozone oxidizing being m a range of from about 55 degrees F. to less than or equal to about 80 degrees F.;

(II) mixing the wastestream with at least one target Sorbent material such that isotopes are removed from the wastestream;

(III) separating the wastestream into Solid and Liquid components;

(IV) treating the wastestream by Selective Ion exchange (IX); and (V) final processing, wherein at least one step is chosen from group consisting of:
(Va) discharging the wastestream in said aqueous form, and
(Vb) drying of a resulting wastestream having dissolved solids to Dry Solids, as said solidified form, the drying being done in an environment where the pH is from about 12 to about 13; and wherein at least one substep is chosen from a group, when the wastestream contains C-14, consisting of:

an antifoaming agent being used for decreasing a presence of a foam volume in the presence of, and generated by, a gas during the use of the loop for recirculation of the recycle oxidation vessel, the process being subject to control through eliminating foam generated during processing; and, wherein, further including adding an anti-foaming agent to the recycle oxidation vessel in step (I), in step (II), further comprising adding as a part of the mixing at least one substance selected from a group of substances consisting of a) CaCl2, b) Ca(NO3)2 and c) other soluble calcium salts, prior to step (I), lowering the pH of the wastestream to a pH range of about 5 to about 7, and rendering a wastestream processing environment such that it can be evacuated at a vacuum up to about 28 in. Hg., and returning the pH to a level to reconvert a boric acid volume in the wastestream to a sodium borate volume, so that any dissolved boric acid/sodium borate is not removed in step (I), after step (I), lowering the pH of the wastestream to a pH range of about 5 to about 7, and rendering a wastestream processing environment such that it can be evacuated at a vacuum up to about 28 in. Hg.; and returning the pH to a level to reconvert a boric acid volume in the wastestream to a sodium borate volume, so that any dissolved boric acid/sodium borate is not removed in step (II), prior to step (I), lowering the pH of the wastestream to a pH range of about 5 to about 7, and rendering a wastestream processing environment such that it can be evacuated through a degassifier with vacuum; and returning the pH to a level to reconvert a boric acid volume in the wastestream to a sodium borate volume, so that any dissolved boric acid/sodium borate is not removed in step (I), after step (I), lowering the pH of the wastestream to a pH range of about 5 to about 7, and rendering a wastestream processing environment such that it can be evacuated through a degassifier with vacuum; and returning the pH to a level to reconvert a boric acid volume in the wastestream to a sodium borate volume, so that any dissolved boric acid/sodium borate is not removed in the following step (II), just prior to the final processing step (V), placing the resulting wastestream in a monitor tank where the wastestream can be analyzed for isotopic content, and in the drying step (Vb) the wastestream being brought to a temperature range of greater than or equal to about 100 degrees C. to a temperature of less than or equal to about 240 degrees C.

33. A process for treating a liquid or aqueous wastestream comprising at least one of a group of wastes consisting of radioactive concentrate fluid, historic waste and other forms of environmental or hazardous waste or radwaste product from a nuclear facility; inherently containing when present, without specific addition, chelant and organics; and converting the wastestream into at least one of two selected forms including a form which is a solidified form for disposal and an aqueous form which can be safely discharged to the environment, the process comprising the steps of:

(I) ozone oxidizing the wastestream where a temperature is maintained through adjustment in a range of from about 20 degrees C. to about 25 degrees C., a pH is maintained through adjustment in a range of from about 11 to about 12, and, wherein, an ORP in a range of from about +500 mV to about +1000 mV indicates that chelant oxidation processing and chelant destruction is occurring, and wherein the ozone oxidizing is adjusted through treatment with anti-foaming substances; such that any existing chelant chemical compound or organic substance contained in the wastestream is rendered non-effective as a chelant of metals or destroyed thereby releasing the metals into ionic form for treatment as follows, (II) mixing the wastestream with at least one target Sorbent material such that isotopes are removed from the wastestream;

(III) separating the wastestream into Solid and Liquid components; and (IV) final processing, wherein at least one step is chosen from a group consisting of:

(IVa) discharging the wastestream in said aqueous form, and (IVb) drying of a resulting wastestream having dissolved solids to Dry Solids, as said solidified form; and wherein at least one substep is chosen from a group, when the wastestream contains C-14, consisting of:

in step (II), further comprising adding as a part of the mixing at least one substance selected from a group of substances consisting of a) CaCl2, b) Ca(NO3)2 and c) other soluble calcium salts, prior to step (I), lowering the pH of the wastestream to a pH range of about 5 to about 7, and rendering a wastestream processing environment such that it can be evacuated at a vacuum up to about 28 in. Hg., and returning the pH to a level to reconvert a boric acid volume in the wastestream to a sodium borate volume, so that any dissolved boric acid/sodium borate is not removed in step (I), after step (I), lowering the pH of the wastestream to a pH range of about 5 to about 7, and rendering a wastestream processing environment such that it can be evacuated at a vacuum up to about 28 in. Hg.; and returning the pH to a level to reconvert a boric acid volume in the wastestream to a sodium borate volume, so that any dissolved boric acid/sodium borate is not removed in the following step (II), prior to step (I), lowering the pH of the wastestream to a pH range of about 5 to about 7, and rendering a wastestream processing environment such that it can be evacuated through a degassifier with vacuum; and returning the pH to a level to reconvert a boric acid volume in the wastestream to a sodium borate volume, so that any dissolved boric acid/sodium borate is not removed in step (I), after step (I), lowering the pH of the wastestream to a pH range of about 5 to about 7, and rendering a wastestream processing environment such that it can be evacuated through a degassifier with vacuum; and returning the pH to a level to reconvert a boric acid volume in the wastestream to a sodium borate volume, so that any dissolved boric acid/sodium borate is not removed in step (II), just prior to the final processing step (IV), placing the resulting wastestream in a monitor tank where the wastestream can be analyzed for isotopic content, and in the drying step (IVb) the wastestream being brought to a temperature range of greater than or equal to about 100 degrees C. to a temperature of less than or equal to about 240 degrees C.

* * * * *